Figure 1:
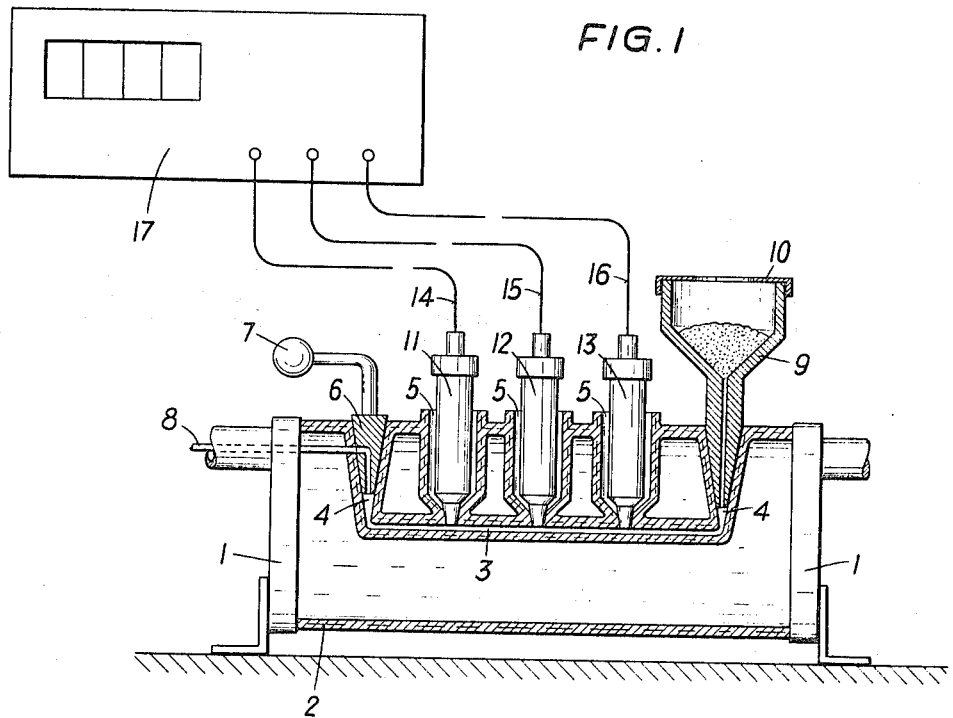

United States Patent

Harnoncourt

[15] 3,639,829
[45] Feb. 1, 1972

[54] MEASURING INSTRUMENT FOR THE DETERMINATION OF THE PARTIAL PRESSURE OF OXYGEN AND CARBON DIOXIDE AND OF THE PH VALUE OF A BLOOD SAMPLE

[72] Inventor: Karl Harnoncourt, Graz, Austria
[73] Assignee: Hans List, Graz, Austria
[22] Filed: Apr. 22, 1969
[21] Appl. No.: 818,288

[30] Foreign Application Priority Data

Apr. 30, 1968 Austria .............................. A 4208/68

[52] U.S. Cl. .............................. 324/30 R, 23/230 B, 23/253, 204/1 T
[51] Int. Cl. ...................................................... G01n 27/42
[58] Field of Search ...................... 324/30, 29; 204/1 T, 195; 23/230, 253

[56] References Cited

UNITED STATES PATENTS 3,127,254  3/1964  Astrup ..................................... 23/230
3,327,204  6/1967  Hillier ..................................... 324/30

Primary Examiner—Michael J. Lynch
Attorney—Watson, Cole, Grindle & Watson

[57] ABSTRACT

A measuring instrument and system for the determination of the partial oxygen and carbon dioxide pressures and of the pH value of a blood test sample having a thermostatized measuring vessel with a measuring capillary tube inserted therein to contain the blood test sample with three receiving bores in the measuring vessel and three measuring electrode units one of which being oxygen sensitive with the second carbon dioxide sensitive and the third being pH sensitive. Each of the measuring sensors are in contact with the said blood test sample and a measuring and recording device for electrode conductively connected with one of the measuring electrode units with a conical receiving bore provided on the measuring vessel. Three control bores terminate in the conical receiving bore and a switch element is inserted in the receiving bore to register with the control bores in three different positions with a pumping device providing for alternate suction and delivery strokes and a pipeline connects the pumping device with the control bores. A gas intake pipe connects the pressure tank with the second control bore and a suction pump and a suction pipe connect the latter with the third control bore and a conical filler connection is mounted on the measuring vessel and is connected with the extremity of the measuring capillary tube opposite the switch member.

2 Claims, 2 Drawing Figures

MEASURING INSTRUMENT FOR THE DETERMINATION OF THE PARTIAL PRESSURE OF OXYGEN AND CARBON DIOXIDE AND OF THE PH VALUE OF A BLOOD SAMPLE

This invention relates to a measuring instrument for the determination of the partial pressures of oxygen and carbon dioxide and of the pH value of a blood test sample contained in a measuring capillary tube inside a thermostatized vessel by means of three measuring electrode units connected to a measuring and recording instrument, one of which comprises an oxygen-sensitive, the other a carbon-dioxide-sensitive, and the third a pH-sensitive sensor, the said sensors being in contact with the blood test sample.

Determinations of the partial oxygen and carbon dioxide pressures as well as of the pH value of a blood test sample are essential operations of the blood microanalysis procedure which is a method of clinical examination of considerable importance for the diagnosis of ailments of the heart, the lungs or of metabolic diseases and distinguishes itself in particular by the fact that very small quantities of blood (about two to three drops) only are required for the measurements. In addition to the determination of the aforementioned values, microanalysis of the blood also includes the determination of other characteristic values nomographically ascertainable from the said measurements, such as the determination of the bicarbonate content of the blood test sample.

Before the measurements are carried out, the measuring capillary tube and the chambers and cavities of the measuring container communicating with same should first be cleaned and dried and the measuring electrodes tested at certain intervals of time by means of thermostatized and steam-saturated test gases and buffer solutions. After the recording instrument has been properly readjusted, if necessary, the blood test sample, mixed with an anticoagulation agent and preserved in a tube is introduced into the measuring capillary tube, whereupon the measuring and recording instrument is switched on. In order to obtain the best results from the measurements of the partial pressures, the blood contained in the measuring capillary tube should be moved to and fro in front of the electrodes by means of a pumping comprising a pump communicating in any suitable way with the measuring capillary tube and alternatingly producing a vacuum or overpressure. Following the reading of the partial oxygen and/or carbon dioxide pressures shown on the recording instrument it will be necessary to clean and dry the measuring capillary tube preferably by introducing distilled water and by connecting the other end of the measuring capillary tube to a suction pump. For measuring the pH value an electrolytic connection to a reference electrode has to be established. For extremely accurate examinations the three most important pH values of the measured blood test sample are as follows:

1. The so-called actual pH value of the unaltered blood test sample,
2. the pH value following the balancing of the blood test sample with a test gas having a low partial carbon dioxide pressure,
3. the pH value following the balancing of the blood test sample with a test gas having a high partial carbon dioxide pressure.

In view of the log. function between $p.CO_2$ and the pH value, the values thus measured permit, in a manner known per se, further nomographic evaluations and readings of additional informations, such as bicarbonate, $p.CO_2$ etc.

The procedure of obtaining the proper balance of partial pressures between the test gas and the blood test sample is termed equilibration.

The apparatus formerly used for carrying out microanalyses of the blood are of a relatively complicated construction calling for the use of highly skilled operators and requiring an extremely concentrated effort in operation, if the measurements are to produce useful results, or else simplification of certain procedures can be achieved only at the expense of the accuracy of the measurements.

With the conventional types of these measuring devices the partial gas pressures and the pH value are determined in at least two isolated thermostatized measuring heads, each of which includes a measuring capillary tube and the corresponding measuring electrodes. However, the operation of these conventional instruments is highly complicated and tiresome. Apart from the need for two consecutive testing procedures involving washing and drying operations, the necessity of establishing communication between the measuring capillary tubes and the above-mentioned auxiliary devices in accordance with the various operational stages is a considerable handicap for the speedy progress of measurements.

In particular, equilibration by means of two test gases with a known carbon dioxide content with the conventional equipment available require particular attention and skill on the part of the operator and tiresome cleaning procedures following each measurement. Owing to these facts and to the numerous sources of error leading to absolutely meaningless measuring results as a result of even minor mistakes on the part of the operator, a prejudice against this method of measurement has developed among experts, preventing the general use and propagation of this valuable means of diagnosis.

It is the object of the invention to provide a measuring apparatus of the type referred to above which permits avoidance of the shortcomings of conventional equipment and will produce dependable results at greater speed of the measuring operations. For the purpose, according to the invention, the three sensors are all accommodated in a common measuring container and communicate with the measuring capillary tube through an aperture provided in the said capillary tube for each of the said sensors, a switchover cock being provided at one end of the measuring capillary tube, by means of which the measuring capillary tube can be attached as required to such connections as are provided on the container for test gas feed pipes, a pumping device with alternating suction and delivery strokes and a suction pump. Thus the operational steps required for the determination of the partial oxygen and carbon dioxide pressures as well as of the pH value can be performed in rapid succession and concentrated upon the narrow space of the thermostatized container. At the same time, sources of individual errors liable to distort the results of the measurements are practically eliminated by the simple and largely mechanized operation of the instrument.

In view of these features, the measuring instrument according to the invention is particularly suitable for semi- or fully automatic operation with the use of a corresponding program control. This can be used both for the switchover of the recording instrument from one measuring electrode to the other, for the operation of the pumping device and of the suction pump as well as for the actuation of a switchover cock operated by a rotary magnet by means of appropriately timed switch pulses.

According to a preferred embodiment of the invention, the end of the measuring capillary tube opposite the switchover cock is designed as a conical filler vent destined to receive the blood test sample or a mixing hopper. Such an instrument is suitable not only for the determination of the aforesaid partial pressures and of the actual pH value but also for the special operation of the microanalysis of the blood gas termed equilibration. In order to initiate this operational step it is only necessary to place the switchover cock in a position where the measuring capillary tube communicates with the required calibration gas feed pipe. The test gas flowing into the measuring capillary tube then forces the blood test sample into the mixing funnel, if provided, wherein the blood test sample is subsequently enriched with test gas. The mixing hopper can be conveniently cleaned after removing it from the measuring head. When one-way mixing hoppers are used no cleaning is required at all.

Figure 2:
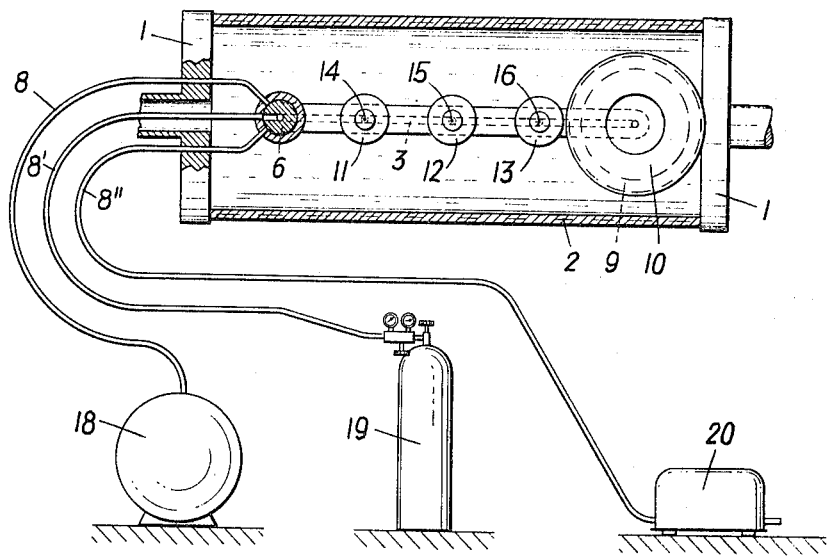

Further details of the invention will appear from the following description of an embodiment of the invention with reference to the accompanying schematic drawings of the measuring instrument wherein:

FIG. 1 is a longitudinal cross-sectional view of a measuring instrument according to the invention; and FIG. 2 a partially sectional top view of the instrument shown in FIG. 1.

The measuring container of the instrument is designed as a hollow cylindrical glass flask 2 arranged in a horizontal position and tightly closed at both ends by means of caps 1. The glass flask 2 whose longitudinal extension is shown as being interrupted in the drawing is filled with a liquid which is maintained at an approximate temperature of about 37° C. by thermostat, so as to provide conditions similar to the body temperature during the measurements.

Sealed into the glass flask 2 is a measuring capillary tube 3 extending in the longitudinal direction of the flask, the two ends of the said measuring capillary tube terminating in a flared-out aperture 4 leading to the upper side of the glass flask 2. From the measuring capillary tube 3 extend apertures 5 destined to receive the measuring electrodes 11, 12 and 13. The electrode 11 is oxygen sensitive, the electrode 12 carbon dioxide sensitive and the electrode 13 pH value sensitive. The electrodes are connected to an electric measuring and recording device 17 by means of connecting lines 14, 15 and 16. With the three electrodes ($O_2$, $CO_2$, pH) installed in place, the measuring sensors are located in the lumen of the measuring capillary tubes 3, the fourth aperture being designed to produce the electrolytic bridge leading to the reference electrode.

As illustrated on the left side of the drawing, in the flared-out aperture 4 of the measuring capillary tube 3 a roughly sketched switchover cock 6 with a control knob 7 is inserted. In this aperture 4 three of connecting lines 8, 8' and 8'' terminate, of which line 8 is connected to a pumping device 18 with alternating suction and delivery strokes, line 8' to a source 19 of test gas and line 8'' to a suction pump. Depending on requirements, the measuring capillary tube 3 can be either impinged upon by test gases of different carbon dioxide and oxygen contents from the source 19 of test gases by appropriately setting the switchover cock 6 or else connected to the device 18 or the suction pump 20. These auxiliary devices are in permanent communication via appropriate lines with the measuring system.

For the purpose of equilibration, a mixing hopper 9 with its cover 10 on top, can be inserted with a tight fit into the flared-out aperture 4 of the measuring capillary tube 3 opposite the switchover cock 6, as shown in the drawing. With the mixing hopper 9 removed, the right-hand aperture 4 of the measuring capillary tube 3 defines the filler vent for receiving the blood test sample.

At the beginning of the measurement, the measuring capillary tube 3 is washed with distilled water and dried in a manner not to be described at any length here. If required, the measuring electrodes inserted in the receiving apertures 5 are subsequently checked, the switchover cock 6 being placed in a switch position where a thermostatized and steam-saturated test gas enters the measuring capillary tube 3 through one of the pipe 8'. After the recording instrument connected to the measuring electrodes 11, 12, 13 has been corrected, if necessary, the measuring operation proper can be started. Now the blood test sample is introduced into the measuring capillary tube 3 through the filler vent 4 and after the electrolytic bridge leading to the reference electrode has been produced, the reading of the pH value is first obtained from the measuring instrument. Then the switchover cock 6 is placed in a position where the measuring capillary tube 3 is connected to the pumping device 18. By the alternating suction-and-pressure effect of the pumping device a reciprocating movement is imparted to the blood test sample in the measuring capillary tube. Now the partial oxygen pressure and the partial carbon dioxide pressure of the blood test sample can be read on the recording instrument 17 and duly recorded. Upon completion of the measuring operation, the measuring capillary tube is again cleaned and dried, while being connected to the suction pump 20 of the measuring system by means of the switchover cock 6 and the line 8''.

The the equilibration of a blood test sample contained in the measuring capillary tube 3, the mixing hopper 9 is inserted in the aperture 4 and by means of the switchover cock placed in an appropriate position, a test gas of a determined carbon dioxide concentration is introduced into the measuring capillary tube 3 which causes the blood to rise in the mixing hopper wherein the blood test sample is intimately mixed with the test gas under continuous formation of bubbles, so that the blood test sample assumes the same exactly defined carbon dioxide partial pressure of the test gas. After the gas flow has been stopped by means of the switchover cock 6, the equilibrated blood is drawn back by capillary action from the hopper 9 into the measuring capillary tube 3 where the pH value is again measured. Equilibration with the second test gas and the subsequent third pH measurement are carried out in a similar manner, whereupon the hopper 9 is removed and the measuring capillary tube washed and dried so as to be ready for the next measuring operation.

I claim:

1. A measuring instrument for the determination of the partial oxygen and carbon dioxide pressures and of the pH value of a blood test sample, comprising a thermostated measuring vessel, a measuring capillary tube lightly inserted in said measuring vessel and containing said blood test sample, three receiving bores terminating in said measuring capillary tube, three measuring electrode units, a first of said units comprising an oxygen-sensitive measuring sensor, the second of said units comprising a carbon-dioxide-sensitive measuring sensor, and the third of said units comprising a pH-sensitive measuring sensor, each of said measuring sensors inserted in a respective one of said receiving bores and being in contact with said blood test sample, a measuring and recording device, means to selectively connect said measuring and recording device to one of said measuring electrode units, a conical receiving bore provided on said measuring vessel and connected to one end of said measuring capillary tube, three control bores terminating in said conical receiving bore, a switchcock inserted in said receiving bore and registering with one of said control bores in each of three different switch positions, a pumping device with alternating suction and delivery strokes, a pipeline connecting said pumping device with one of said control bores, a pressure tank containing a test gas, a gas intake pipe connecting said pressure tank with a second one of said control bores, a suction pump, a suction pipe connecting said suction pump with a third one of said control bores, and a conical filler connection method on said measuring vessel and connected with the other end of the measuring capillary tube opposite the switchcock.

2. A measuring instrument according to claim 5, comprising a mixing hopper insertable in the said conical filler connection of the measuring vessel.

* * * * *